United States Patent [19]

Babbitt

[11] 4,329,866
[45] May 18, 1982

[54] BEAM TRANSFER MECHANISM

[75] Inventor: Albert B. Babbitt, Bloomfield Township, Oakland County, Mich.

[73] Assignee: Premier Forging Press Automation, Inc., Madison Heights, Mich.

[21] Appl. No.: 168,393

[22] Filed: Jul. 10, 1980

[51] Int. Cl.³ .............................................. B21D 43/05
[52] U.S. Cl. ...................................... 72/405; 198/750; 414/751
[58] Field of Search ................ 72/405, 404, 421, 419, 72/422; 198/750, 621; 414/751

[56] References Cited

U.S. PATENT DOCUMENTS

| 3,456,814 | 7/1969 | Bautz | 198/750 |
| 3,805,582 | 4/1974 | Logan | 72/405 |
| 3,907,098 | 9/1975 | Babbitt | 414/751 |
| 4,133,199 | 1/1979 | Shirao | 72/421 |
| 4,160,372 | 7/1979 | Bergman | 72/421 |

Primary Examiner—Gene Crosby

Attorney, Agent, or Firm—Whittemore, Hulbert & Belknap

[57] ABSTRACT

A beam-type transfer mechanism for moving workpieces step by step along a row of stations through the dies of a press to progressively form a blank into a finished part. A pair of laterally spaced beams extend parallel to the row of stations, having opposed work holding fixtures cooperable to grip the workpiece. The beams are movable in operation laterally toward and away from each other, vertically up and down, and longitudinally, to simultaneously advance the workpieces one step at a time from station to station. The dies would ordinarily be removable and replaceable through the front of the press except for one of the beams which occupies and obstructing position throughout its entire operative movement. Means are provided to lift the beams sufficiently to enable the removal and replacement of the dies through the front of the press without obstruction.

8 Claims, 13 Drawing Figures

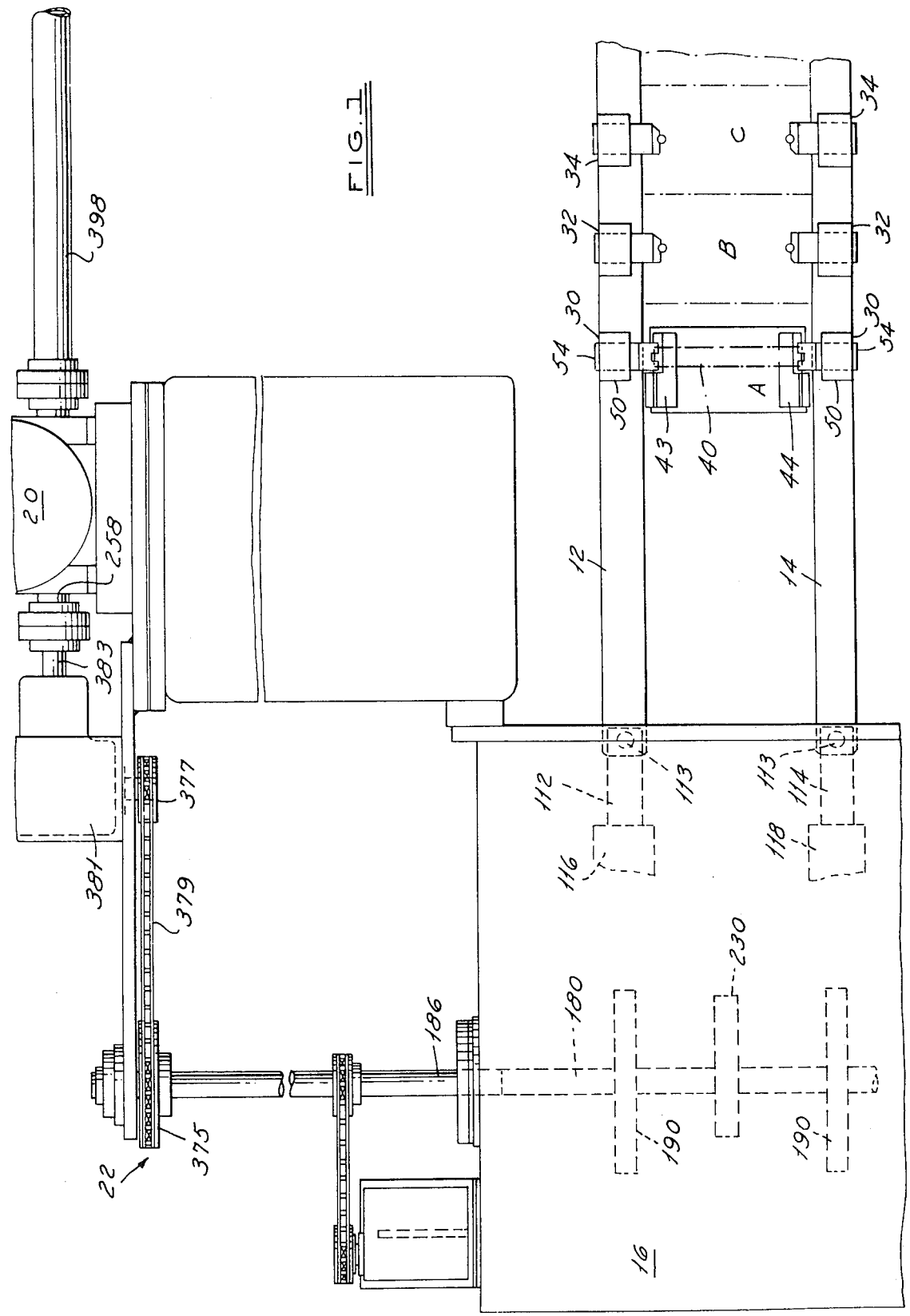

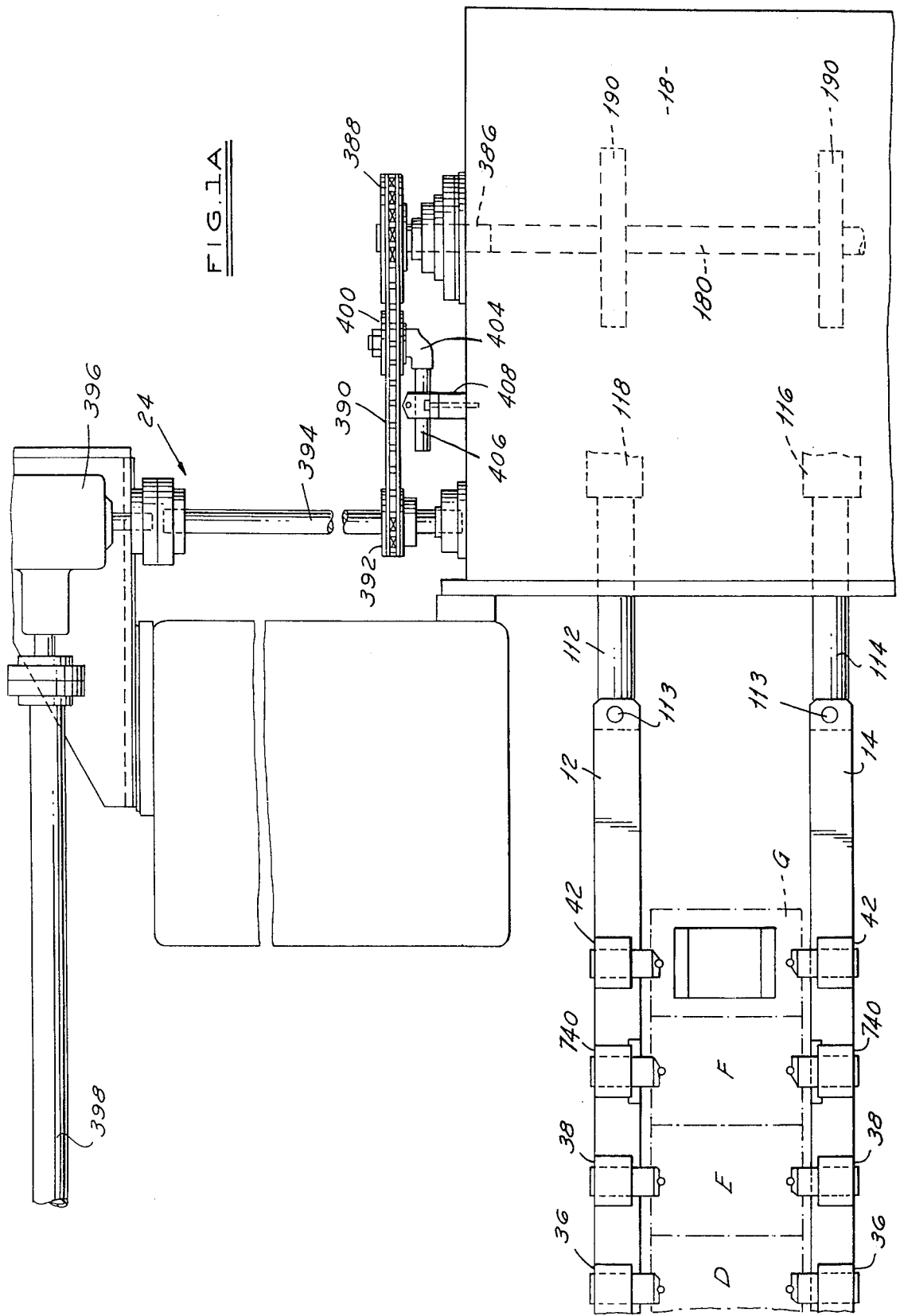

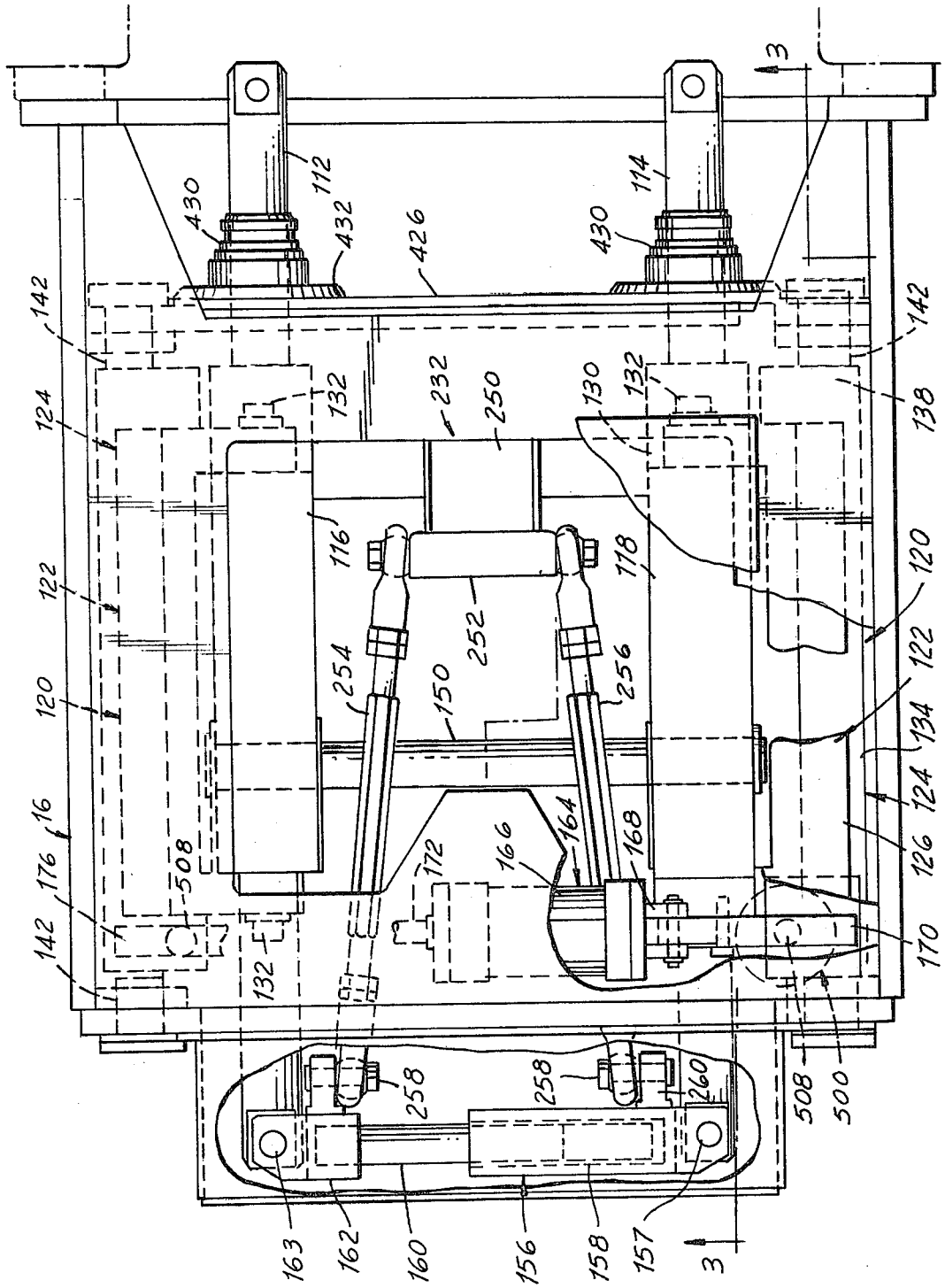

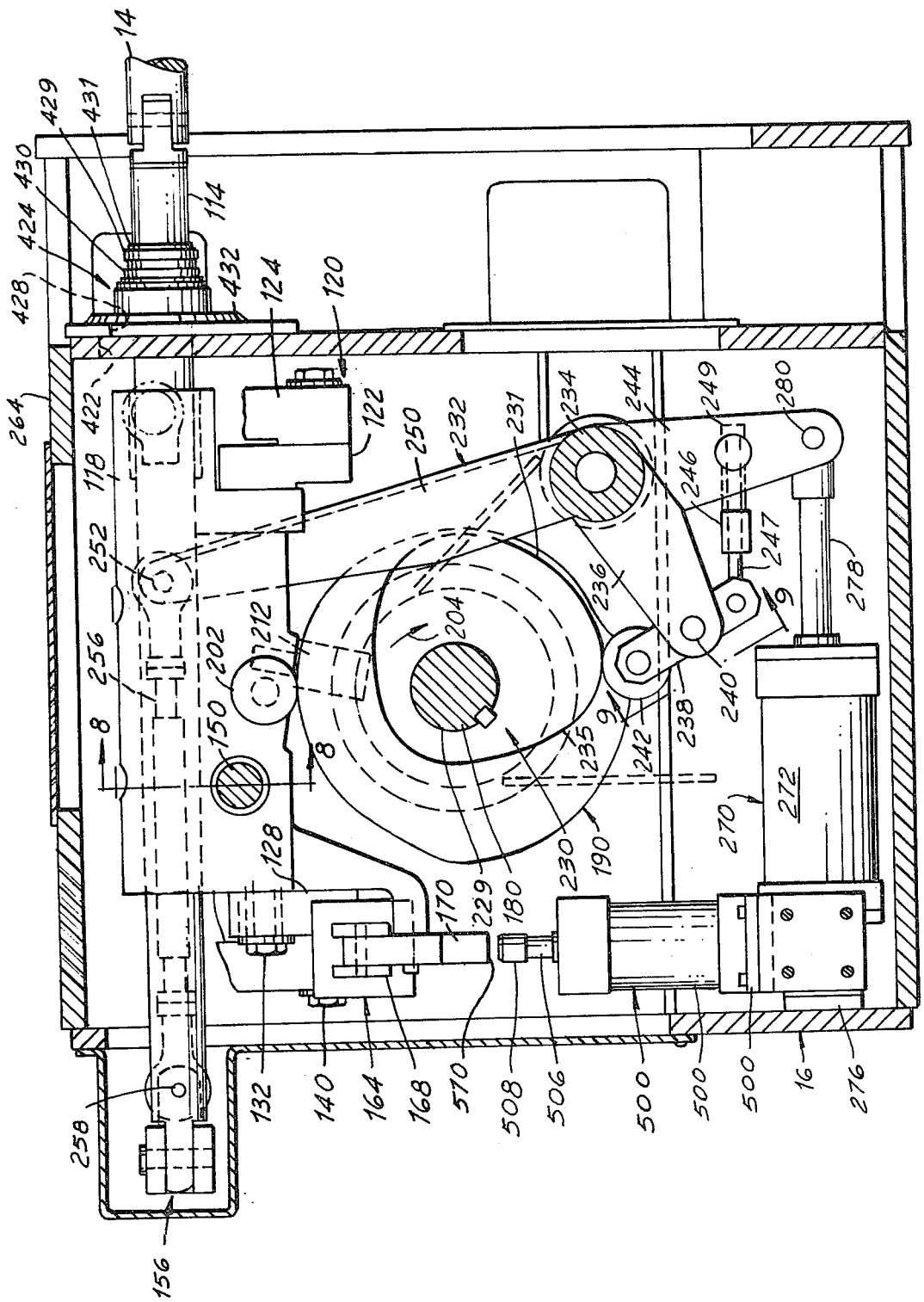

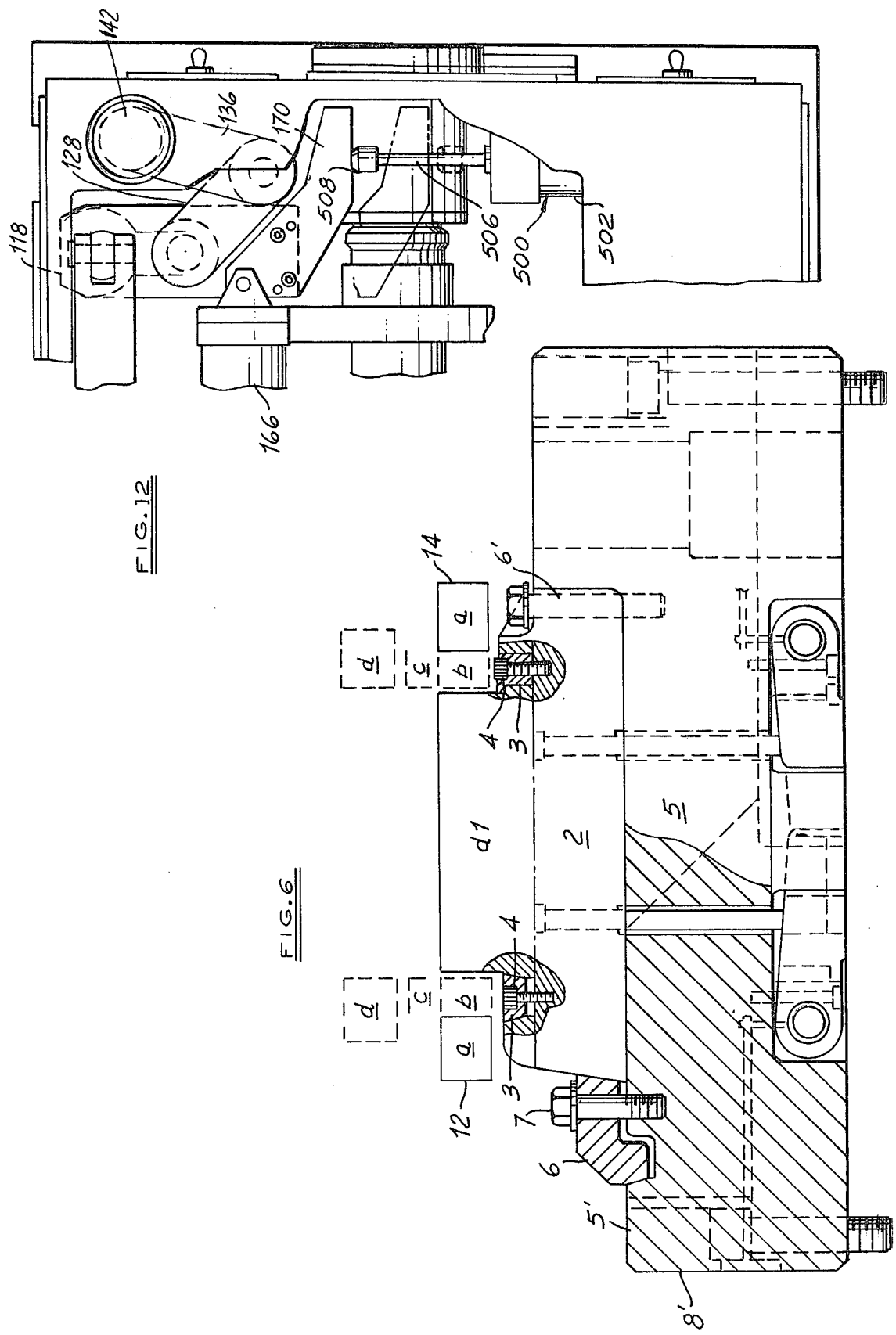

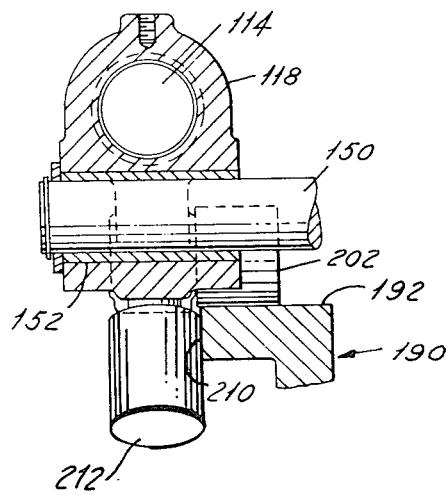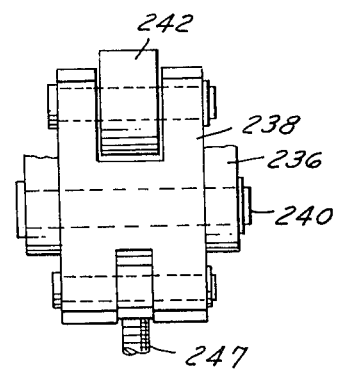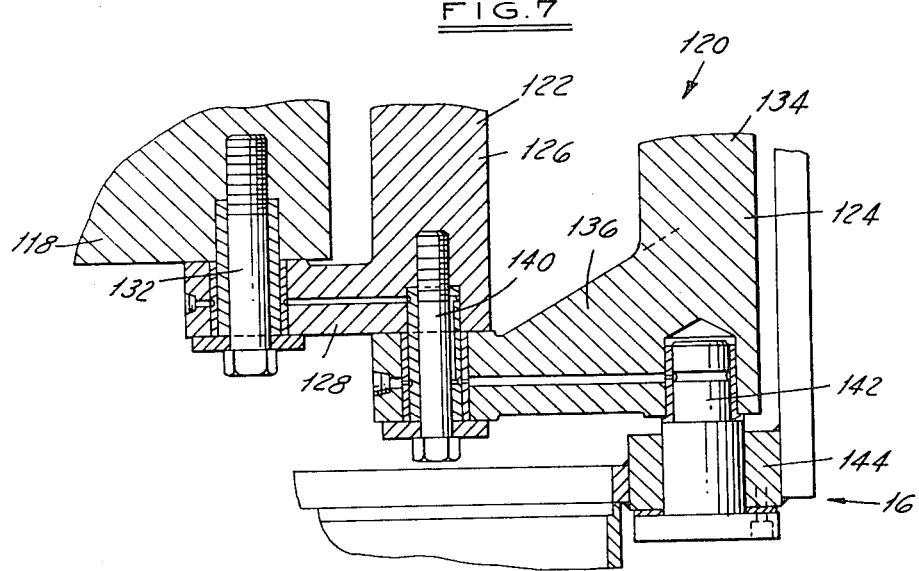

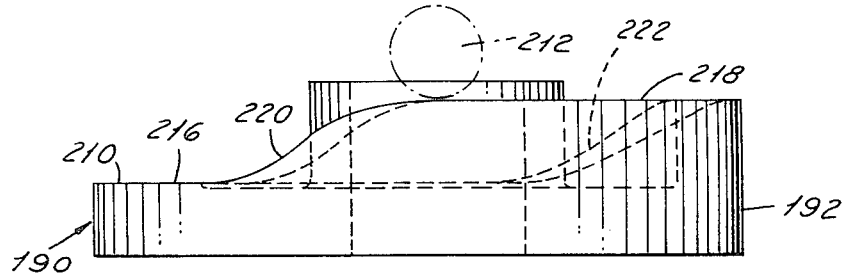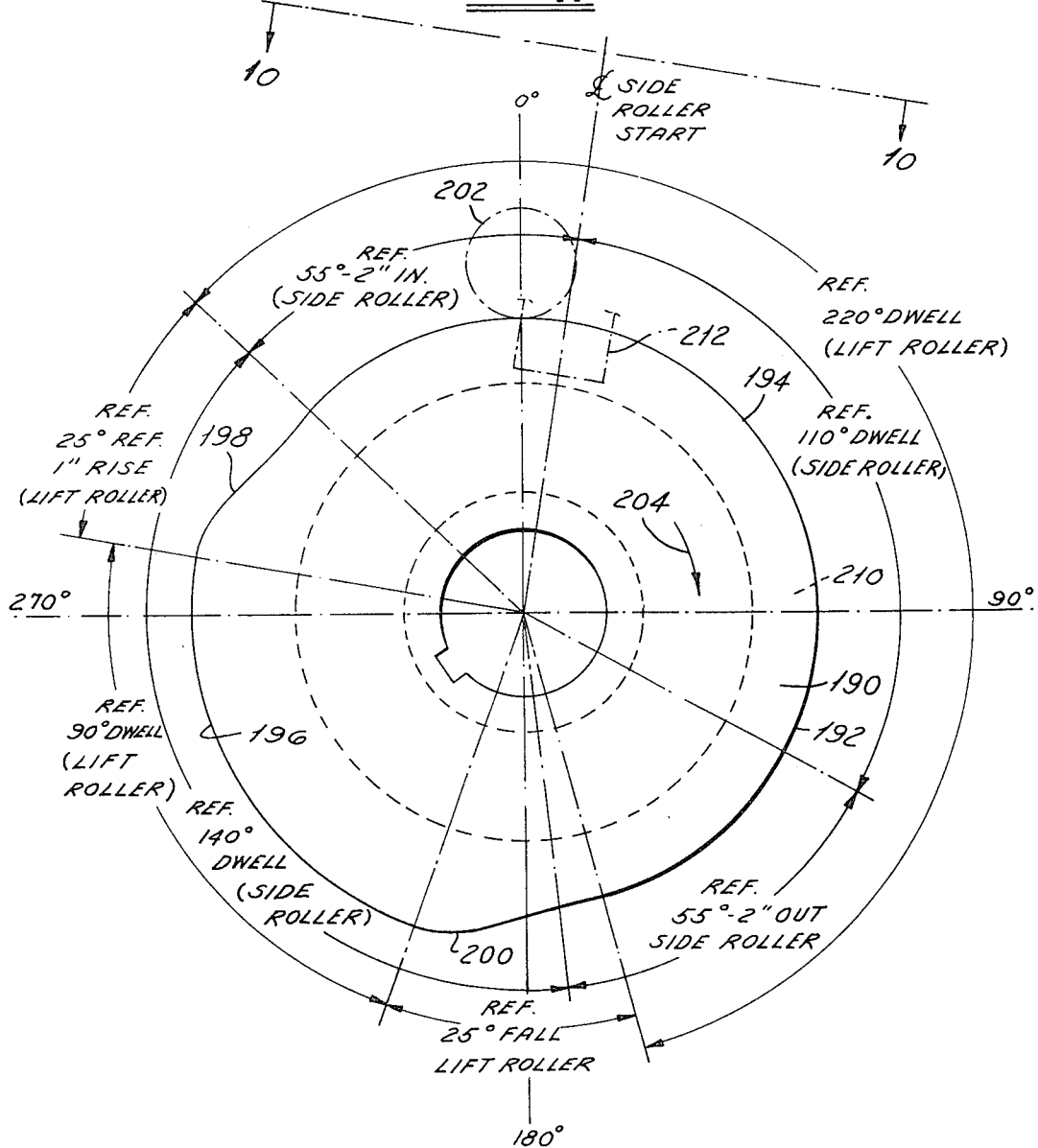

BEAM TRANSFER MECHANISM

This invention relates generally to transfer mechanism for moving workpieces step by step along a row of stations through the dies of a press, and refers more particularly to a beam-type transfer mechanism designed to facilitate the removal and replacement of the dies.

SUMMARY OF THE INVENTION

The parallel beams of this transfer mechanism of the embodiment about to be disclosed have their ends respectively slidably supported in carriers. These carriers are simultaneously moved in and out, that is toward and away from each other to cause the opposing fixtures thereon to grip and release the workpieces. The carriers are likewise simultaneously moved up and down to raise the gripped workpieces away from the stations and to lower them back to the stations. The carriers support the beams for longitudinal sliding movement so that they may be simultaneously moved longitudinally in a forward direction to advance the workpieces one station at a time through the dies of the press and rearwardly to return the empty work holding fixtures to their starting positions.

Control units are provided at both ends of the beam transfer mechanism which are synchronized to effect a simultaneous movement of the carriers so as to maintain the parallel relationship of the beams throughout their vertical and horizontal movements. Each control unit includes cams which engage followers on the carriers to carry out the vertical and horizontal movements of the carriers in a timed sequence. Such cams of the two units are driven from a common source to coordinate their movements. One of the control units has a cam drive for affecting the longitudinal movement of the beams in timed sequence with the vertical and horizontal movements thereof.

The above-described structure described in my prior U.S. Pat. No. 3,907,098 is highly effective in carrying out its intended function. However, as pointed out more fully hereinafter, one of the beams, throughout its entire operative movement, occupies positions obstructing the removal and replacement of the dies. Accordingly, a primary object of the invention is to provide means to facilitate the removal and replacement of the dies without obstruction from the transfer mechanism.

BRIEF DESCRIPTION OF THE DRAWINGS

FIG. 1 is a top plan view of a portion of a beam transfer mechanism constructed in accordance with my invention.

FIG. 1A is a top plan view of the remainder of the beam transfer mechanism shown in FIG. 1.

FIG. 2 is a top plan view with parts broken away of one of the control units provided at one end of the transfer mechanism.

FIG. 3 is a sectional view taken on the line 3—3 in FIG. 2.

FIG. 6 is a view taken at right angles to the view of FIG. 5, with parts in section, showing the relationship of the transfer beams to the lower dies of the press.

FIG. 7 is a fragmentary sectional view taken on the line 7—7 in FIG. 4.

FIG. 8 is a fragmentary sectional view taken on the line 8—8 in FIG. 3.

FIG. 9 is a fragmentary detail view taken in the direction of the arrow 9 in FIG. 3.

FIG. 10 is an edge view of one of the cams.

FIG. 11 is a plan view of the cam shown in FIG. 10.

FIG. 12 is similar to a portion of FIG. 4, but shows another position of parts where the lift cylinders are extended (solid lines) and retracted (dotted lines).

DETAILED DESCRIPTION

Referring now more particularly to the drawings, and especially to FIGS. 1 and 1A, the beam transfer mechanism will be seen to comprise a pair of elongated horizontal laterally spaced beams 12 and 14, beam operating mechanism including the control units 16 and 18 at opposite ends of the beams, and a motor 20 and transmissions 22 and 24 operating from the motor to drive the two control units in synchronism.

The beams 12 and 14 extend along a row of work stations A, B, C, D, E, F, G, which in this instance are spaced apart equal distances. A fixed lower die is provided at each work station except station A, which is the loading station. The lower dies are each cooperable with an upper die to form a workpiece progressively from a starting blank to a finished part as it moves from station to station through the press beginning at station A and ending at station G. The work transfer mechanism of this invention is designed to simultaneously transfer the workpieces from one station to the next for successive and progressive forming into the finished part by the press dies.

Figure 5:
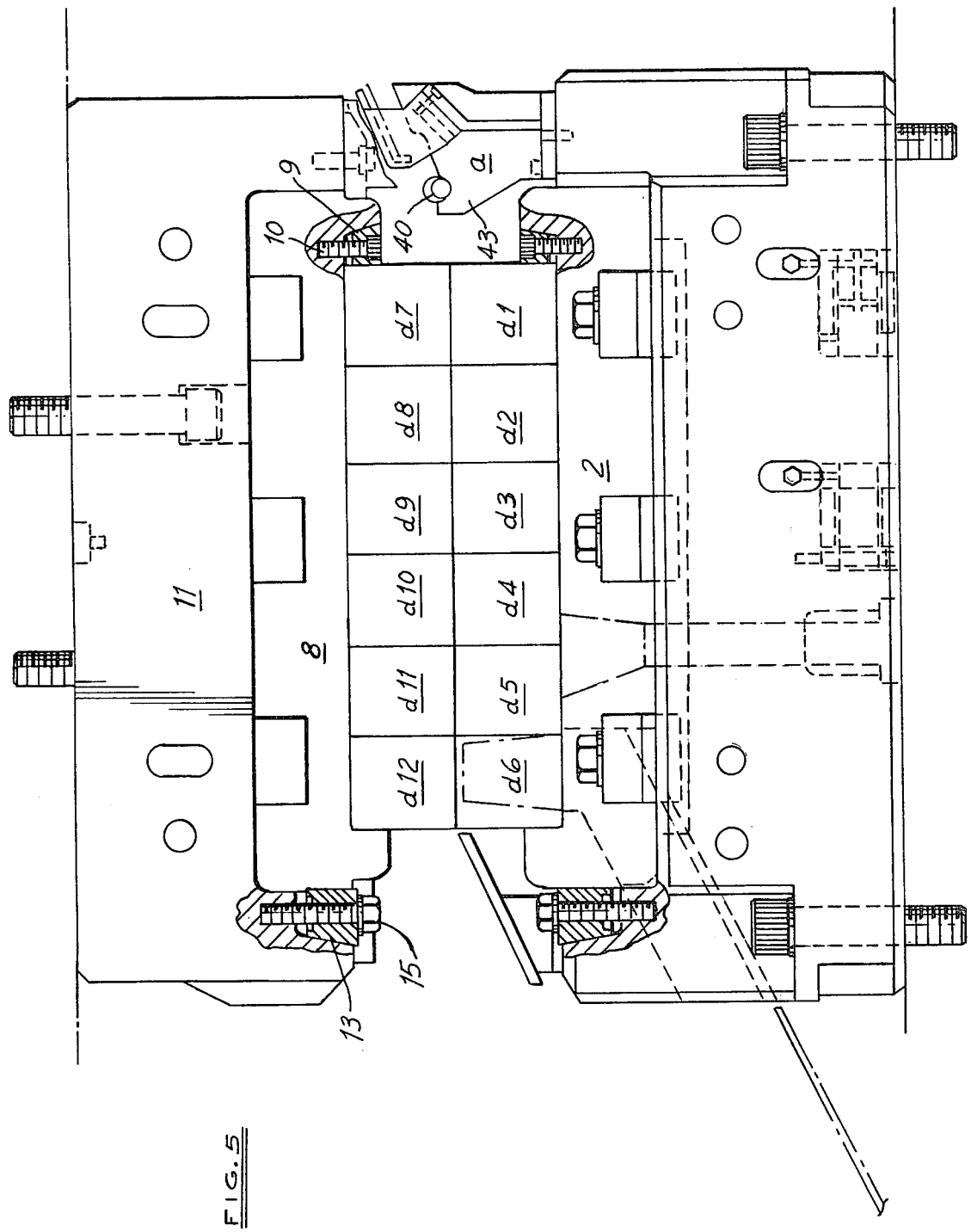
FIG. 5 is an elevational view with parts in section showing the upper and lower dies of the closed press.

Referring to FIGS. 5 and 6, the lower dies d1-d6 of the press, at stations B-G respectively, are removably secured to a so-called mini-bolster 2 by clamps 3 held by bolts 4 threaded into the mini-bolster. The mini-bolster is removably secured to the flat top surface 5' of the main bolster 5 by bolts 6' threaded into the latter and also by clamps 6 held by bolts 7 threaded into the main bolster, which latter is mounted in fixed position on the bed of the press.

The upper dies d7-d12 of the press directly above lower dies d1-d6 respectively, are removably secured to a mini-bolster 8 by clamps 9 held by bolts 10 threaded into the mini-bolster. The mini-bolster is removably secured to the main bolster 11 by clamps 12 held by bolts 15 threaded into the main bolster, which is mounted on a ram (not shown) that is power driven vertically up and down to effect the progressive formation of a workpiece between the cooperable upper and lower dies.

As seen in FIG. 5, the lower dies of the press are disposed between the beams 12 and 14. Beam 12 extends along the front of the press and beam 14 along the rear. The beams move through the various positions shown, as will be pointed out more clearly hereinafter.

Each of the beams 12, 14 has mounted thereon a plurality of work holding fixtures 30, 32, 34, 36, 38, 740 and 42 which are spaced apart equal distances corresponding to the spacing between adjacent work stations. The work holding fixtures on one of the beams are respectively disposed opposite to the correspondingly numbered work holding fixtures on the other beam. Thus the opposed correspondingly numbered work holding fixtures cooperate with one another to grip a workpiece and transfer the same during the operation of the beam transfer mechanism.

The work holding fixtures 30 are shown disposed at station A in FIG. 1. A workpiece blank 40 in the form of a bar is supported at the ends on workpiece holders 43 and 44 which support the opposite ends of the blank 40 in substantial alignment with the work gripping portions of the fixtures 30. When the beams 12 and 14 move laterally inwardly, the ends of the blank 40 are engaged by the work gripping portions of fixtures 30, and the blank is then raised from the station A by the elevation of the beams, as more fully described hereinafter. The fixtures 32, 34, 36, 38, and 740, and 42 also have work gripping portions to grip the workpieces at the other stations when the beams 12, 14 move inwardly so that the workpieces at all stations may be gripped and raised simultaneously. The specific construction of the fixtures and of the work gripping portions thereof can be found in the above-identified U.S. Patent.

The beams 12 and 14 have beam extensions or beam ends 112 and 114 removably secured to the ends thereof by fasteners 113 as shown in FIGS. 1 and 1A. These beam ends could be made integral with the beams, if desired. They extend into the control units 16 and 18 and are subject to the action of the control units to effect the in and out, up and down, and forward and rearward movement of the beams 12, 14.

Reference is now made particularly to FIGS. 2–4 and 7–9 for a description of the control unit 16, which is in the form of a cabinet. As there shown, the parallel beam ends 112 and 114 are slidably supported for longitudinal movement in elongated horizontal tubular carriers 116 and 118. These carriers are mounted inside the control unit for horizontal and vertical movement. Actually the support for these carriers permits them to move in other than truly horizontal and vertical directions and in fact permits universal movement with the limitation that during any such movement of the carriers they are constrained to maintain a true parallel relationship at all times. Thus each carrier will be disposed with the orientation of its axis always the same no matter what its position. In other words, the mounting of each carrier is such that its longitudinal axis in any position is parallel to its axis in any other position.

The mounting of the carriers may best be seen in FIGS. 2, 3, 4, and 7. As there shown, each carrier is pivotally supported by a linkage 120 so that the longitudinal axis of one carrier is parallel to that of the other.

Each linkage 120 includes two generally C-shaped frames 122 and 124. The frame 122 is in the form of an elongated bar 126 having parallel arms 128 and 130 at the ends of the bar which extend at right angles thereto. These arms 128 and 130 are pivoted at points remote from bar 126 on the aligned pivot pins 132 which are secured to the ends of each carrier and are parallel to the longitudinal axis of the carrier. The frame 124 has an elongated bar 134 and parallel arms 136 and 138 at the ends of the bar extending at right angles thereto. The arms 136 and 138 are pivoted at points remote from the bar 134 on the aligned pivot pins 40 secured to the ends of the bar 126 of frame 22. Pins 140 are parallel to pivot pins 132. The bar 134 of frame 124 is pivoted on aligned pivot pins 142 mounted in fixed frame portions 144 in the side walls on the control unit 16. Pins 142 are parallel to the pivot pins 132 and 140. It will be apparent from the mounting of the carriers by the linkages 120 that the parallel carriers will maintain a parallel relationship with one another throughout the full range of movement permitted by the linkages.

A shaft 150 extends between and is journaled in bearings 152 in carriers 116 and 118 to prevent the carriers from rotating on the beam extension 112 and 114. The shaft 150 extends at right angles to the carriers.

The beam extensions 112 and 114 are prevented from rotating in the carriers by the piston-cylinder assembly 156 which includes a cylinder 158 pivotally connected by transverse pin 157 to the end of beam 114 and a plunger 160 reciprocable in the cylinder and having a fitting 162 on its end pivotally connected by transverse pin 163 to the end of beam end 112. (FIGS. 2 and 4) Accordingly, the beams 12 and 14 are kept from turning and the work holding fixtures 30, 32, 34, 36, 38, 740 and 42 remain upright.

The carriers 116 and 118 are urged at all times toward one another for a purpose to be made more apparent hereinafter by a piston-cylinder assembly 164 (FIG. 4) which includes a cylinder 166 having a fitting 168 pivoted to a portion 170 of carrier 118 and a piston, not shown, reciprocable within the cylinder having a rod 172 provided with a forked end 174 pivoted to a part 176 on the carrier 116. This may, for example, be an air cylinder and air may be supplied under pressure to the rod end of the cylinder to urge the carriers toward one another.

A cam shaft 180 is disposed within the control unit 16 extending horizontally across the control unit beneath and at right angles to the carriers. The ends of the cam shaft 180 are journaled in bearings 182 and 184 mounted in the side walls of the control unit. A drive shaft 186 extends into the control unit and its end has a keyed and piloted connection indicated at 188 with one end of the cam shaft to rotate the cam shaft from the motor 20 and transmission 22 which will be more fully described hereinafter.

A pair of cams 190 are rigidly mounted on the cam shaft 180. These cams are specially formed to control the vertical and horizontal movements of the carriers and are identical to one another. They are mounted on the cam shaft in the same angular position so that the horizontally inward movement, horizontally outward movement, vertical upward movement and vertical downward movement of the two carriers 116 and 118 occur simultaneously.

One of the cams 190 is illustrated in FIGS. 10 and 11. As there shown, the cam 190 has a continuous peripheral cam surface 192 which includes an arcuate lower dwell portion 194 that is concentric with the axis of rotation of the cam and extends throughout an angle of 220° as shown. It also has an upper dwell portion 196 of arcuate form which is concentric with the axis of rotation of the cam and which extends throughout an angle of 90°. The upper dwell portion 196 is of greater radius than the lower dwell portion 194 and the two portions are connected at the ends by inclined ramp cam surface portions 198 and 200. The ramp portion 198 of the cam surface 192 extends through an arc of 25° as does the ramp portion 200. The difference in radius between the two arcuate portions 194 and 196 of the cam surface 192 may vary but a suggested difference in radius is one inch so as to raise the beam carriers 116 and 118 and hence the beam ends 112 and 114 a distance of one inch to correspondingly raise the work gripping fixtures 30–42 on the beams 12 and 14 from their lower to their upper positions. Each carrier has a cam follower or lift roller 202 which rides on the cam surface 192 to raise and lower the carriers in accordance with the contour of cam surface 192 and in response to rotation of the cam shaft in the direction of the arrow 204.

Each cam 190 also has a lateral annular cam surface 210 on the outer side face thereof adjacent its periphery. The cam follower or side roller 212 on each carrier engages the lateral cam surface 210 so as to move the carrier laterally in and out or toward and away from the other carrier in accordance with the contour of the cam surface 210 and in response to rotation of the cam in the direction of the arrow 204.

The cam surface 210 includes two arcuate cam surface portions 216 and 218 each of which extends in a plane normal to the axis of rotation of the cam. The arcuate surface portion 216 is the inner dwell surface portion and extends throughout a distance of 140°. The arcuate surface portion 218 is the outer dwell surface portion and extends throughout an arc of 110°. Inclined ramp portions 220 and 222 connect the ends of the dwell portions 216 and 218 and each extends throughout an angle of 55°. The lateral distance between the planes of the dwell surface portions 216 and 218 may vary depending upon the desired amount of lateral movement of the carriers 116 and 118 and hence of beams 112 and 114, but in the present instance a distance of two inches is suggested to produce a lateral movement of each beam end 112 and 114 of two inches and hence a total relative movement of the two carriers 116 and 118 four inches toward and away from each other. The piston-cylinder assembly 164 which at all times urges the carriers toward one another holds the roller follower 212 in contact with the cam surface 210 of the cams 190.

Also mounted on the cam shaft between the cams 190 is a third cam 230 having the form shown in FIG. 3 for determining the longitudinal movement of the beams relative to the carriers. The carriers are not moved longitudinally by cam 230, but rather the beam ends 112 and 114 are caused to slide in the carriers. The periphery of cam 230 has an arcuate rearward dwell portion 231 of relatively large radius, and arcuate forward dwell portion 229 of relatively small radius, and inclined ramp portions 233 and 235 connecting the two dwell portions. As shown in FIG. 3, a bell crank lever 232 is pivoted on a transverse horizontal shaft 234 mounted in the control unit 16 in suitable bearings. One arm 236 of the bell crank 232 has a lever 238 pivoted at 240 to its outer end. A cam follower or roller 242 is pivoted to one end of the lever 238 and engages the periphery of the cam 230. The other end of the lever 238 is connected to a second arm 244 of the bell crank lever by a rigid yet adjustable connecting link 246. The link 246 may for example be a simple turnbuckle type assembly consisting of members 247 and 249 threaded together and respectively pivoted to lever 238 and arm 244 for lengthening or shortening the link 246 to adjust the position of the roller follower 242. After adjustment, the link 246 remains at a given length as shown in FIG. 3 to maintain the position of the roller follower 242 in fixed relation to the bell crank arm 236.

The bell crank lever 232 has a third cam 250 terminating in a transverse end portion 252 to the ends of which are pivotally connected the rods 254 and 256. The rods 254 and 256 are pivotally connected at their opposite ends by pins 258 to the terminals 260 formed respectively on the fitting 262 and the cylinder 258 of the piston-cylinder assembly 256 which connects the ends of the beam ends 112 and 114.

The cam 230 has the peripheral contour shown in FIG. 3 so that upon rotation of the cam shaft in the direction of the arrow 204 the beam ends 112 and 114 and hence the beams 12 and 14 will be moved longitudinally a distance corresponding to the distance between work stations of the press. The approximate extent of the longitudinal movement can be seen in FIG. 3 from the position of the forward end portions of the rods 254 and 256 shown in both solid and dotted lines. When the roller follower 242 rides on the rearward dwell portion 231 of the cam, the beams are at the rearward position of FIG. 3, and when it rides on the forward dwell portion 229 the beams are at the forward portion to the right of the FIG. 3 position.

A piston-cylinder 270 is provided in order to hold the roller follower 242 in continuous engagement with the periphery of the cam 230. The cylinder assembly 270 includes a cylinder 272 pivoted at 274 to a support 276 fixed to a wall of the control unit 16 and a piston, not shown, therein having a piston rod 278 pivoted at 280 to the lower end of the bell crank arm 244. Air or other fluid medium may be used to apply a constant pressure against the rod end of the cylinder assembly 270 to urge the bell crank lever 232 in a clockwise direction and thereby hold its roller follower 242 in contact with the periphery of cam 230.

FIG. 6 shows the three principal operative positions of the beams 12 and 14 as determined by the cams 190 on which the carriers 116 and 118 have a free-floating engagement by means of roller followers 202 and 212. When rollers 212 engage side cam surface portions 218, the beams assume the outer dwell positions a. When rollers 212 engage side cam surface portions 216, the beams assume the inner dwell positions b. During a cycle of operation, as explained more fully hereinafter, the beams move from positions a to b while in their lower dwell positions as brought about by the engagement of rollers 202 with the peripheral cam surface portions 194. Thereafter, the rollers 202 ride up on peripheral cam surface portions 196 causing the beams to rise to the positions c.

As further noted in FIG. 6, the flat top surface 5' of the main bolster 5 to which the mini-bolster 2 is bolted extends from the front of the mini-bolster entirely to the front 8' of the main bolster without obstruction, so that the mini-bolster 2 with the dies secured thereto could, when the bolts 6' and 7 and clamps 6 are removed and the ram of the press carrying the upper dies are sufficiently elevated, be removed and/or replaced through the front of the press except for the presence of the front beam 12 which in all its operative positions indicated at a, b, and c is in an obstructing position.

The part 170 of carrier 116 and part 176 of carrier 118 have the same configuration, or more exactly, one is a mirror image of the other. Each such part is a flat plate rigidly secured to a carrier and disposed in a plane at right angles to the axes of beams 12 and 14. A hydraulic piston-cylinder assembly 500 beneath each of the parts 170 and 176 has a vertical cylinder 502 mounted on a fixed base 504. A piston (not shown) reciprocable within the cylinder has a rod 506 extending vertically upwardly therefrom. An abutment 508 on the upper end of each rod is engageable with the flat horizontal undersurface 510 of the parts 170 and 176 respectively, although when rods 506 are retracted as in FIG. 4, abutments 508 never contact undersurfaces 500 during normal operation of the beams. The undersurface 510 of each part 170, 176, is laterally elongated so as to be engageable by the abutment 508 of the associated assembly 500 whether the beams 12, 14 and carriers 116, 118 are in the laterally inner or outer positions. The purpose of the assemblies 500 is to lift the beams to the d position (solid lines in FIG. 12), substantially above the upper limit of movement effected by the cams 190 on which the rollers 202 normally have a free-floating engagement. Rollers 212 are long enough to stay in contact with surfaces 210 of cams 190 in the d position. In position d, front beam 12 is raised sufficiently to permit the mini-bolster 2 when unclamped and unbolted, to be removed and/or replaced through the front of the press without obstruction. It will be understood that the other control unit 18, described more fully hereinafter, will also have two hydraulic piston-cylinder assemblies and related apparatus to raise the opposite ends of both beams simultaneously with the raising of those ends raised by piston-cylinder assemblies 500, so that both ends of both beams are raised together, whereby the beams remain horizontal and parallel throughout such movement. It is necessary only that the front beam 12 be so raised to the d position in order to clear the front of the press for removal and/or replacement of the mini-bolster 2 and lower dies without obstruction, but it is desired that both beams partake of the same movements to avoid cocking or straining the interconnecting mechanism. Of course, means (not shown) are provided to operate the piston-cylinder assemblies 500 in control unit 16 as well as those in control unit 18, simultaneously.

The other control unit 18 is exactly like the control unit 16 except that it does not have any means for longitudinally reciprocating the beams 12 and 14, that is it does not have a cam 230, bell crank lever 232, rods 254 and 256 and associated mechanism. Accordingly FIGS. 2–4 and 7–11 which show the control unit 16 and portions thereof, may be considered as also illustrative of the control unit 18, with the understanding that unit 18 does not have any mechanism for reciprocating the beams. It is sufficient and in fact preferred that the longitudinally movement of the beams be effected through mechanism provided in one only of the control units. However, as stated the control unit 18 includes all of the other apparatus of control unit 16 heretofore described, including the beam end carriers, supports for the carriers, and cams to move the opposite beam ends horizontally in and out and vertically up and down in the same manner and at the same time as the beam ends acted upon the control unit 16. The control unit 18 also includes hydraulic piston-cylinder assemblies similar to assemblies 500, for raising the beams away from free-floating support on the cams. The carriers 116, 118 in control unit 18 are at all times aligned with the correspondingly numbered carriers in control unit 16.

The transmission 22 shown in FIG. 1 includes the transmission shaft 186 which drives cam shaft 180 of control unit 16. Shaft 186 has a sprocket 375 driven from sprockets 377 by chains 379. Gear box 381 drives sprocket 377, and is driven by the output shaft 383 of motor 20.

The transmission 24 shown in FIG. 1A has a transmission shaft 386, corresponding to the transmission shaft 186 of transmission 22 which drives cam shaft 180 in control unit 16 for driving the cam shaft of the control unit 18. The transmission shaft 386 has on it a sprocket 388 driven by a chain 390 from a pulley 392 on transmission shaft 394. The transmission shaft 394 is driven from the gear box 396 which is operated by motor 20 from motor output shaft 398. Two idler sprockets are provided for chain 390, one of which is indicated at 400 and the other of which is not shown. Idler 400 is rotatably supported on mount 404 which has threaded rod 406 threadedly engaging bracket 408 secured to the side wall of control unit 18. The threaded rod 406 is removably, rigidly connected to the support 404 and is axially adjustable relative to bracket 408 by rotation so as to correspondingly shift idler 400 either to take up or produce slack in the chain 390. Idler 400 engages one reach of chain 390, and the other idler (not shown) may be similarly mounted and engages the other reach thereof. These idlers are provided to adjust the synchronism of the two control units 16 and 18 by taking up chain slack as more fully described in my above-identified patent.

The front or adjacent wall 420 of control unit 16, which is recessed as seen in FIG. 3, has openings through which the rod ends 114 and 116 of the beams extend. These openings are enlarged to permit the vertical and horizontal movements of the beam ends are sealed by suitable sealing means which prevent dirt from entering the control unit. The openings and sealing means for both rod ends are the same and therefore only those associated with rod end 114 are shown in the drawings. The sealing means 424 comprises a plate 426 secured to the outer surface of the front wall 420 over the opening 422. This plate 426 has two circular openings 428 which are large enough to permit the vertical and horizontal movements of the beam ends 112 and 114. It will be understood that the control unit 18 may have a similar front wall construction and sealing means for the beam ends associated therewith.

The sealing means 424 also includes a helically wound axially compressed spring strip 430 encircling each beam end 112, 114. Each spring strip is a self-expanding helix in which succeeding turns are in radial surface-to-surface contact to exclude dirt. As seen in FIG. 3, the small end of the spring strip is compressed against collar 429 retained by a snap ring 431 held in a groove in the beam end, and the large end is engaged in an annular recess in a sealing plate or ring 432 which encircles the beam end. The sealing rings 432 are pressed by spring strips against the fixed plate 426 and overlie the holes 428 in the fixed plate through which the beam ends extend. The strips 430 are, by virtue of their wound spring construction, capable of self-expanding lengthwise to coincide with and follow the longitudinal movement of the beams while all the time holding the rings 432 sealed over the openings 428 in plate 426. Even when the spring strips expand lengthwise as the beam moves longitudinally to its opposite limit, the successive turns of the strip remain overlapped to exclude dirt. As the beam ends move laterally and vertically, the wound spring strip 430 cause the rings 432 to slide on the fixed plate 426 to follow such movements of the beam ends but keeping the openings 428 covered at all times.

It should be clear from the foregoing the manner in which the beam mechanism is operated to advance workpieces through a press from station to station one step at a time. The two control units are initially adjusted so that they are operative in exact synchronism with one another. In other words, they are adjusted so that at the particular instant in time shown in FIG. 3, which view is taken from the bottom of the sheet in FIG. 1, the cam shaft of control unit 18, if seen from the top of the sheet in FIG. 1A in a view similar to FIG. 3, would be seen turned to the exact same relative position as the cam shaft in FIG. 3, and cams 190 thereof would bear the same relationship to the carrier roller followers. This adjustment is accomplished by shifting both idlers one of which is indicated at 400.

Figure 4:
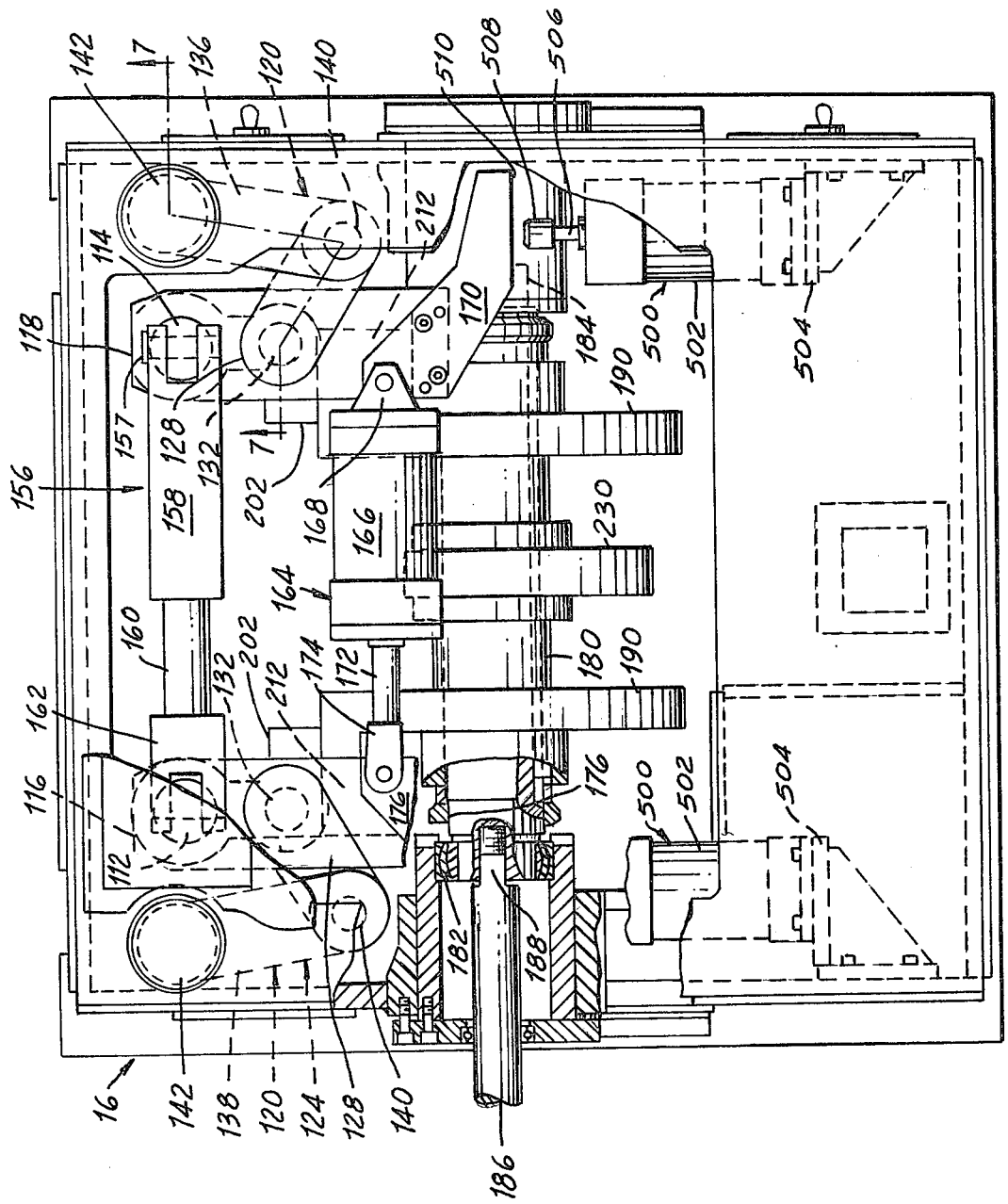
FIG. 4 is an end view with parts broken away and in section of the control unit shown in FIG. 2 as viewed from the left.

The beams and internal parts of the control unit 16 are shown in FIGS. 2-4 in their positions at the beginning of a cycle when the beam carriers 116 and 118, and hence the beams, are in their lowermost and outermost positions. It will be understood that the carriers for the opposite beam end in control unit 18 are likewise in the lowermost and outermost positions. The beams are at the leftmost positions under the control of cam 230 in control unit 16. At this time, the carrier lift rollers 202 are engaging the outer portions 218 of the cam surfaces 192 of cams 190, the carrier in-out rollers 212 are engaging the outer portions 218 of the cam surface 210 of the cams 190 and the roller 242 for longitudinally moving the beams 14 and 16 is engaging the high portions 213 of the cams 230, as shown in FIG. 3. The beams are in the a position (FIG. 6).

The beams 12 and 14 are first moved inwardly to the positions of FIGS. 1 and 1A as the cam shafts 180 of the two control units 16, 18 rotate in the direction of arrow 204. This inward movement is caused by the in-out roller 212 of the carriers riding down the ramps 220 to the inner dwell portions 216 of the cam surfaces 210 of cams 190. At such inner positions of the beams (position b in FIG. 6), the opposed fixtures 30 to 42 on the two beams grip the ends of blanks at the several stations as viewed in the drawings.

As the cam shafts 180 continue to rotate, the carrier lift rollers 202 ride up the ramps 198 to the upper dwell portions 196 of cam surfaces 192 of cams 190 to lift the carriers and thereby also lift the beams and the gripped workpieces from their respective stations. (position c in FIG. 6)

After the beams have been raised, the roller 242 rides down the ramp 233 of the cam 230 to turn the bell crank lever 232 clockwise in FIG. 3 advancing the beams 12 and 14. When the roller 242 reaches the low point 229 of the cam 230, the beams have been advanced the distance of one station, likewise advancing the workpieces one station.

Thereafter the lift roller 202 runs down the ramp 200 of the cam surfaces 192 of cams 190 to the low dwell cam surface portions 194 to lower the beams and thereby deposit the workpieces one station advance from that stations where they were picked up.

Thereafter the in-out roller 212 runs up the ramp portions 222 of cam surfaces 210 of cams 190 to the outer dwell cam surface portions 218 to return the beams to their outermost positions, releasing the workpieces at the stations where they have been deposited. In the outermost positions of the beams, the work holding fixtures 30, 32, 34, 36, 38, 740 and 42 are withdrawn clear of the work.

Next the roller 242 runs up the ramp portion 235 of cam 230 to return to the high portion 231 thereof and accordingly turn the bell crank lever 232 counterclockwise and thus longitudinally move the beams 12 and 14 back to their starting positions ready for the next cycle of operation.

After the beams have returned to their starting positions, the press platen may be lowered to form and trip the workpieces at the stations B-F between upper dies carried by the platen and lower dies located at those stations. Thereafter the upper dies are raised and the cycle repeated.

As noted previously, and as shown in FIG. 6, the front beam 12 throughout its movement from positions a to b to c effectively blocks the removal and/or replacement of the lower dies and mini-bolster to which they are secured through the front of the press. There is no such problem with the upper dies, because the ram or platen on which they are mounted can be raised far enough to clear the beams for removal and/or replacement of the upper dies either through the front or rear of the press.

When it is desired to remove and/or replace the lower dies and mini-bolster 2 through the front of the press, the cylinder assemblies 500 beneath all four carriers at the ends of both beams are operated simultaneously to raise both beams to the d position. In the d position, the front beam 12 is lifted far enough to permit the removal and replacement of the lower dies, with or without the mini-bolster 2, through the front of the press without obstruction. The only reason for also raising the rear beam is to prevent the connecting mechanism from warping or twisting. The carriers, which normally have a free-floating roller support on cams 190, are readily lifted therefrom by the cylinder assemblies 500.

It will be understood that the rams of the press cannot ordinarily be elevated sufficiently to raise the upper dies far enough so that the unbolted and unclamped lower dies can be removed by lifting them over the front beam 12 while in the a, b, or c position. In any event, it is preferred to remove the lower dies, while attached to the mini-bolster, by a direct, horizontal forward movement, and that is the reason for providing means to raise the beam 12 to the d position.

I claim:

1. Transfer mechanism for moving workpieces step by step along a row of stations of a press, dies at each station for progressively forming a workpiece from a starting blank to a finished part as it is moved from station to station through the press, each die comprising a lower die, a pair of laterally spaced beam transfer devices extending parallel to said row of stations, and cooperable to grip, release and transfer workpieces from station to station, one of said devices extending along the front of said dies and the other of said devices extending along the rear thereof, beam operating mechanism for moving said devices laterally toward and away from each other to grip and release the workpieces, for raising and lowering said devices after they have been moved laterally toward each other to raise workpieces gripped thereby from said stations and lower the same to said stations, and for moving said devices longitudinally after they have been raised to advance each workpiece gripped thereby to the next station in the row, said front beam transfer device throughout the aforesaid raising and lowering and lateral and longitudinal movement thereof occupying positions obstructing the removal and replacement of said lower dies through the front of the press, and means for lifting said front beam transfer device far enough to permit the removal and replacement of said lower dies through the front of the press without obstruction.

2. Transfer mechanism for moving workpieces step by step along a row of stations of a press, dies at each station for progressively forming a workpiece from a starting blank to a finished part as it is moved from station to station through the press, each die comprising a lower die, a pair of laterally spaced beams extending parallel to said row of stations, one of said beams extending along the front of said dies and the other of said beams extending along the rear thereof, workpiece holding fixtures on each beam spaced apart distances corresponding to the distance between stations, the fixtures on one beam being respectively opposed to those on the other beam so that each pair of opposing fixtures is cooperable to grip a workpiece, beam operating mechanism for moving said beams laterally toward and away from each other to cause the opposing fixtures to grip and release the workpieces, for raising and lowering said beams after they have been moved laterally toward each other to raise workpieces gripped by opposing fixtures from said stations and lower the same to said stations, and for moving said beams longitudinally after they have been raised to advance each workpiece gripped by opposing fixtures to the next station in the row, said front beam throughout the aforesaid raising and lowering and lateral and longitudinal movement thereof occupying positions obstructing the removal and replacement of said lower dies through the front of the press, and means for lifting said front beam far enough to permit the removal and replacement of said lower dies through the front of the press without obstruction.

3. Transfer mechanism for moving workpieces step by step along a row of stations of a press, dies at each station for progressively forming a workpiece from a starting blank to a finished part as it is moved from station to station through the press, each die comprising a lower die, a pair of laterally spaced beams extending parallel to said row of stations, one of said beams extending along the front of said dies and the other of said beams extending along the rear thereof, workpiece holding fixtures on each beam spaced apart distances corresponding to the distance between stations, the fixtures on one beam being respectively opposed to those on the other beam so that each pair of opposing fixtures is cooperable to grip a workpiece, beam operating mechanism for moving said beams laterally toward and away from each other to cause the opposing fixtures to grip and release the workpieces, for raising and lowering said beams after they have been moved laterally toward each other to raise workpieces gripped by opposing fixtures from said stations and lower the same to said stations, and for moving said beams longitudinally after they have been raised to advance each workpiece gripped by opposing fixtures to the next station in the row, said beam operating mechanism including a control unit adjacent each end of said beams, each control unit having first means operable to laterally move said beams, each control unit having second means operable to raise and lower said beams, said first and second means comprising rotatable cams having cam surfaces engageably with followers associated with said beams to provide a free-floating support for said beams by said cams, one of said control units having third means to move said beams longitudinally, said front beam throughout the aforesaid raising and lowering and lateral and longitudinal movement thereof occupying positions obstructing the removal and replacement of said lower dies through the front of the press, and means for lifting said front beam away from free-floating support on said cams sufficiently to raise said front beam far enough to permit the removal and replacement of said dies through the front of the press without obstruction.

4. Transfer mechanism as defined in claim 2 or 3, wherein said lifting means comprises a fluid piston-cylinder assembly associated with each end of said front beam.

5. Transfer mechanism for moving workpieces step by step along a row of stations of a press, dies at each station for progressively forming a workpiece from a starting blank to a finished part as it is moved from station to station through the press, each die comprising a lower die and a vertically movable, cooperable upper die, a pair of laterally spaced beams extending parallel to said row of stations, one of said beams extending along the front of said dies and the other of said beams extending along the rear thereof, workpiece holding fixtures on each beam spaced apart distances corresponding to the distance between stations, the fixtures on one beam being respectively opposed to those on the other beam so that each pair of opposing fixtures is cooperable to grip a workpiece, a carrier supporting each end of each beam for longitudinally sliding movement, beam operating mechanism for moving said beams laterally toward and away from each other to cause the opposing fixtures to grip and release the workpieces, for raising and lowering said beams after they have been moved laterally toward each other to raise workpieces gripped by opposing fixtures from said stations and lower the same to said stations, and for moving beams longitudinally after they have been raised to advance each workpiece gripped by opposing fixtures to the next station in the row, said beam operating mechanism including a control unit adjacent each end of said beams, each control unit having first means operable to laterally move said carriers, each control unit having second means operable to raise and lower said carriers, said first and second means comprising rotatable cams beneath said carriers having cam surfaces engageable with followers on said carriers to provide a free-floating support for said carriers by said cams, one of said control units having third means to move said beams longitudinally relative to said carriers, said front beam throughout the aforesaid raising and lowering and lateral and longitudinally movement thereof occupying positions obstructing the removal and replacement of said lower dies through the front of the press, and means for lifting the carriers for said front beam away from free-floating support on said cams sufficiently to raise said front beam far enough to permit the removal and replacement of said lower dies through the front of the press without obstructions.

6. Transfer mechanism as defined in claim 5, wherein said lifting means comprises a fluid piston-cylinder assembly operably engageable with each carrier for said front beam.

7. Transfer mechanism as defined in claim 5, including second means for lifting the carriers for said rear beam way from free-floating support on said cams when said front beam is thus lifted so that both beams are raised and lowered from free-floating support in unison.

8. Transfer mechanism as defined in claim 7, wherein said first-mentioned and said second lifting means comprises a hydraulic piston-cylinder assembly operably engageable with each carrier.

* * * * *